United States Patent [19]

Kennedy

[11] 4,316,973

[45] Feb. 23, 1982

[54] NOVEL TELECHELIC POLYMERS AND PROCESSES FOR THE PREPARATION THEREOF

[75] Inventor: Joseph P. Kennedy, Akron, Ohio

[73] Assignee: The University of Akron, Akron, Ohio

[21] Appl. No.: 73,789

[22] Filed: Sep. 10, 1979

[51] Int. Cl.$^3$ ................... C08F 8/26; C08F 10/10
[52] U.S. Cl. .................... 525/335; 525/332; 525/334; 525/337; 525/366; 526/348.6; 526/348.7
[58] Field of Search ............ 526/348.7, 348.6; 525/366, 334, 335, 332, 337

[56] References Cited

U.S. PATENT DOCUMENTS

| | | | |
|---|---|---|---|
| 3,024,226 | 3/1962 | Nolan | 526/348.7 |
| 3,634,383 | 1/1972 | Miller | 526/348.7 |
| 4,152,499 | 5/1979 | Boerzel et al. | 526/348.7 |
| 4,276,394 | 6/1981 | Kennedy et al. | 525/245 |

*Primary Examiner*—William F. Hamrock
*Attorney, Agent, or Firm*—Oldham, Oldham, Hudak & Weber Co.

[57] ABSTRACT

Novel telechelic olefin and hydroxy polymers particularly those of polyisobutylene are prepared according to the process set forth herein. Preparation of a telechelic diolefin polyisobutylene includes the steps of refluxing a solution of telechelic dihalogen polyisobutylene, adding a solution of a strong base such as potassium t-butoxide and stirring to form the telechelic diolefin polyisobutylene. This telechelic diolefin can be converted to the telechelic dihydroxy by refluxing a solution of the former, hydroborating the diolefin to a polymeric borane and oxidizing the polymeric borane to form the telechelic dihydroxy polyisobutylene. The processes are also applicable to the conversion of trihalogenated polyisobutylenes to telechelic triolefin and trihydroxy polyisobutylene tristars.

6 Claims, No Drawings

NOVEL TELECHELIC POLYMERS AND PROCESSES FOR THE PREPARATION THEREOF

TECHNICAL FIELD

The present invention is directed toward a process for the synthesis of novel telechelic, or terminally functional polymers such as polyisobutylenes carrying either terminal unsaturations or hydroxyl groups. These compositions can be further utilized in the synthesis of other compositions such as the polyurethanes, polyanides, polyesters and polyepoxides. To practice the process of the present invention it is first necessary to begin with a telechelic isobutylene which, in turn, involves polymerization of the monomer and a multifunctional compound capable of simultaneously initiating polymerization and acting as a transfer agent. For this compound, the term inifer has been employed, derived from the words initiator and transfer.

Telechelic polymer diolefins would be a most important intermediate for the preparation of various other telechelic polymer structures, i.e., polymer dialcohols, dialdehydes, diacids, diamines and diesters. The diolefin polyisobutylene can also be hydrosilylated which reaction would lead to a great variety of other products.

Telechelic di- and trihydroxy polyisobutylenes are also useful compounds which could be reacted with diisocyanates and triisocyanates to yield linear or crosslinked products, respectively and would be valuable intermediates for the preparation of polyurethanes via isocyanate chemistry.

BACKGROUND ART

Synthesis of polyisobutylenes carrying either unsaturation or hydroxyl groups at both ends, in the case of a linear polymer, or at all ends in the case of a star polymer structure, e.g., one having at least three polymer arms one end of each is linked to a common nucleus, requires that the polyisobutylene first be telechelic or terminally functional. Second, to avoid separate syntheses from different end groups, it is necessary that the functionality be identical. In this manner synthesis will occur simultaneously at all termini.

Unfortunately, it has not been possible heretofore to prepare certain isobutylenes having identical termini. Prior investigations with other co-workers in the laboratories of the Assignee or record herein have demonstrated that certain unsaturated organic halides in combination with $BCl_3$ are effective initiating systems for isobutylene polymerization to form asymmetric telechelic polymers i.e., polyisobutylenes having an olefinic head and an alkyl halide end group. These investigations have been published and include: J. P. Kennedy, S. Y. Huang and S. C. Feinberg, J. Polymer Sci., Polymer Chem. Ed. 15, 2843 (1977); J. P. Kennedy, S. Y. Huang and R. A. Smith, Polymer Bulletin 1, 000 (1979); and J. P. Kennedy, S. Y. Huang and R. A. Smith, J. Polymer Sci., Polymer Chem. Ed., (submitted).

At least one U.S. patent of which I am aware, is directed toward a method of forming polyisobutylene having an unsaturated group at each end. That U.S. Pat. No. 3,634,383, discloses the contacting of isobutylene with a 5 Å molecular sieve supposedly to extract a hydride ion from the monomer. Despite the claim that a product having two terminal double bonds thereby resulted, I am not aware that this work has ever been successfully duplicated and, in fact, the patentee has more recently stated that the polyisobutylene made by 5 Å molecular sieves contained less than two olefinic end groups, i.e., 1.70–1.32, per mole. These results have been published: S. L. Manatt, J. D. Ingham and J. A. Miller, Jr., Organic Magnetic Resoanance, 10, 198 (1977).

With respect to polyhydrocarbon diols, telechelic polybutadiene and polyisoprene diols have been prepared according to a process contained in recent literature: Schnecks, H., Degler, G., Dongonski, H., Caspary, R., Angerer, G. and NG, T. S., Angen. Makromol. Chem., 70, 9 (1978). However, the functionalities of these molecules were only close to but not exactly two. A functionality of exactly 2.0 is mandatory for efficient molecular weight extension by condensation with diisocyanate chemistry.

With respect to polyisobutylene, U.S. Pat. No. 3,392,154 discloses a method of producing saturated rubbery carboxy or hydroxy functional terminated polyisoolefins by reacting a low unsaturated polyisoolefin with ozone then a hydrogen containing compound and finally an oxidizing or reducing agent. The preparation of hydroxy terminated polyisobutylene is also disclosed by R. L. Zapp, G. E. Serniuk, and L. S. Minckler, *Rubber Chemistry and Technology*, Vol. 43, No. 5, (1970), and involves the direct reduction of carboxy terminated polyisobutylene with lithium aluminum hydride in ethyl ether. The carboxy terminated polymer was in turn prepared by the ozonolytic cleavage of piperylene butyl, set forth in greater detail in the aforementioned patent.

The functionality of these carboxy and hydroxy terminated polymers was not exactly 2.0 as indicated by Table VII of the publication to Zapp et al wherein the carboxy functionality per polymer molecule was represented as 1.91 to 1.96 and as evidenced by the fact that Exxon has prepared and submitted samples of the carboxy terminated polyisobutylene to requesting parties, furnishing descriptions of the polymer product therewith as having a molecular weight of about 1800 and a functionality of 1.95. Also in a publication, F. P. Baldwin, G. W. Burton, K. Griesbaum and G. Hanington, *Advances in Chemistry Series*, No. 91, 448–464 (1969), F. P. Baldwin being the patentee of U.S. Pat. No. 3,392,154, the carboxy terminated polyisobutylene is described as a liquid rubber with a molecular weight of between 1800 to 3500 and an average functionality of about 1.8 carboxy groups per molecule.

Inasmuch as the conversion of carboxyl groups to hydroxyls cannot increase the average functionality per molecule, which may actually decrease, a dihydroxy terminated polyisobutylene of 2.0 functionality would not be obtained. As stated hereinabove, a functionality of exactly 2.0 is mandatory for subsequent reactions involving the telechelic polymer. And, while these methods exist for adding terminal functionality of more than 1.0 but less than 2.0, none is directed toward terminal functionalities of 3.0 which would be required with star polyisobutylenes.

DISCLOSURE OF INVENTION

It is therefore an object of the present invention to provide novel telechelic diolefin or triolefin polymers.

It is another object of the present invention to provide a process for the synthesis of linear and star polyisobutylenes carrying terminal unsaturation.

It is a further object of the present invention to provide novel telechelic dihydroxy or trihydroxy polymers.

It is yet another object of the present invention to provide a process for the synthesis of hydroxyl terminated linear and star polyisobutylenes.

These and other objects, together with the advantages thereof over the prior art, which shall become apparent from the specification which follows, are accomplished by our invention as hereinafter described and claimed.

As used herein, telechelic is indicative of a polymer molecule having terminal functionality. The telechelic polymers of the present invention are synthesized from polymers carrying halogen termini which are, in turn, prepared from the corresponding monomer and an inifer. The telechelic halogenated polymers have from 2 to about 6 polymer arms, each of which has polymerized from what will be described as the inifer residue and carries a tertiary halogen terminus. The functional sites carried by the inifer are eventually carried by the telechelic polymer, a difunctional inifer giving rise to a telechelic difunctional polymer and a trifunctional inifer giving rise to a telechelic trifunctional polymer tristar. Insofar as the functionalities of the inifer are identical, the inifer and resulting telechelic polymer are symmetric.

Inasmuch as the inifer residue is relatively small when compared to the number average molecular weight of each polymer arm, the latter ranging from about 500 to about 50,000, its presence can be disregarded for purposes of discussion herein. Therefore, the molecular weight of a linear polyisobutylene will range from 1,000 to 100,000 while that of a polyisobutylene tristar will range from 1,500 to 150,000. For convenience, the products will be considered throughout as linear and tristar polymers, respectively both of which are terminally functional or telechelic.

In general, the process of the present invention for the synthesis of telechelic diolefin polymers comprises the steps of charging a solution of a telechelic dihalogen polymer to a reaction vessel, refluxing the solution and adding a solution of a strong base such as potassium t-butoxide with stirring to form the telechelic diolefin polymer. The process can also be applied to telechelic trihalogen polymers to form a telechelic triolefin polymer. A suitable solvent for the solutions is tetrahydrofuran.

A process is also provided for the conversion of telechelic diolefin polymers to telechelic dihydroxy polymers and comprises the steps of charging a solution of a telechelic diolefin polymer to a reaction vessel, refluxing the solution while hydroborating the telechelic diolefin polymer to form a polymeric borane and, oxidizing the polymeric borane to form a telechelic dihydroxy polymer. The process can also be applied to telechelic triolefin polymers to form telechelic trihydroxy polymers.

The preferred polymers comprise polyisobutylenes, either linear or star, which therefore carry terminal unsaturation or hydroxyl groups.

Synthesis of the starting telechelic dihalogen polymer is also disclosed herein and basically involves the polymerization of isobutylene or other suitable monomer in the presence of an inifer. The preferred inifer employed is p-di(2-chloro-2-propyl)benzene, or 1,4-bis(α,α-dimethyl chloromethyl) benzene also referred to as p-dicumyl chloride and abbreviated pDCC. The composition resulting from this polymerization comprises two polyisobutylene arms both of which are polymerized from the inifer residue. Practically, this polymer can also be thought of as a symmetrical dihalogenated homopolymer viz., α-ω,di(t-chloro)polyisobutylene.

By selecting an inifer having more than two halogens such as 1,3,5-tris(α, α-dimethyl chloromethyl) benzene, also commonly referred to as symmetric tricumyl chloride and abbreviated TCC, it is possible to form a telechelic polymer structure having three halogen terminated arms or branches viz., tri(t-chloro)polyisobutylene tristar. Accordingly, if the inifer has more than three halogens, a polymer having as many arms will result. Generally the number of arms can range from 2 to about 6 and the telechelic polymer will be symmetric in that each arm will carry the same terminus.

Similarly, the telechelic polymers of the present invention can be synthesized from telechelic halogenated polymers other than di(t-chloro)polyisobutylene according to the process disclosed herein. Suitable monomers forming said polymers are disclosed hereinbelow.

PREFERRED MODE FOR CARRYING OUT THE INVENTION

Before describing the synthesis of a polyisobutylene carrying terminal unsaturation and, in turn, an hydroxyl terminated polyisobutylene from the latter, the syntheses of di- and triterminally halogenated polyisobutylenes shall be briefly set forth. For a more detailed explanation and understanding of the synthesis of telechelic halogenated polyisobutylenes, reference should be made to copending application U.S. Ser. No. 73,790, now U.S. Pat. No. 4,276,394, an application specifically directed to polymer syntheses utilizing inifers and commonly owned herewith by the Assignee of record herein, the subject matter of which is hereby incorporated by reference.

Accordingly, synthesis of a telechelic dihalogenated polyisobutylene is set forth first and is based on the use of a bifunctional compound, for which the term inifer has been selected. The inifer, short for initiator-transfer agent, not only provides for the controlled initiation and propagation of the polymerization reaction, which many initiators do, but in addition can and does function effectively in the important step of chain transfer. The rate of chain transfer to the chain transfer agent must be favored over the rate of chain transfer to the monomer in order for the chain transfer agent to be useful and the synthesis of telechelic polymer successful. This necessary occurence has been demonstrated in the aforementioned application, Ser. No. 73,790, now U.S. Pat. No. 4,276,394.

The preferred monomer employed is isobutylene; the polymer polyisobutylene (PIB) being particularly useful. Number average molecular weight of the polyisobutylene can vary depending upon desired end use; however weights of from about 500 to about 150,000 are obtainable via the process disclosed herein. In addition to isobutylene, other cationically polymerizable olefinic monomers having from 4 to about 12 carbon atoms per molecule such as β-pinene, 1-butene, 2-methyl-1-butene, 4-methyl-1-pentene, 3-methyl-1-butene, vinylcyclohexane, isobutyl vinyl ether, ethyl vinyl ether, methyl vinyl ether and the like can be utilized to yield telechelic polymers.

Regarding composition of the telechelic polymer, the bifunctional termini it carries are directly dependent upon the groups originally carried by the inifer. The preferred inifer employed in the laboratories of the Assignee of record therein has been p-dicumyl chloride which provides a tertiary chlorine on the terminal sites of the polymer and a phenyl group at the center. Thus, during synthesis, the halogen functionality of the inifer forms the end and head groups of the polymer yielding the following product:

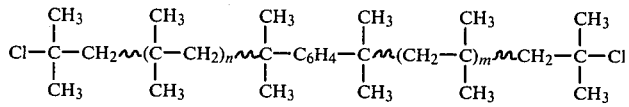

abbreviated by Cl-PIB-Cl herein and referred to as the telechelic dihalogenated polymer.

In addition to p-dicumyl chloride, other inifers that can be utilized for synthesis of halogen terminated polymers have the general formula $AY_n$. The A component of the inifer can be an aromatic moiety, having 1 to about 4 phenyl rings either noncondensed such as phenyl, biphenyl or terphenyl, or condensed such as naphthalene, anthracene, phenanthrene or pyrene. The Y component is represented by the formula

wherein R and R' can be hydrogen, methyl or phenyl and R and R' can be the same and X is F, Cl or Br, and, n is an integer from 2 to 6. The aromatic carbons of A, not carrying Y can be hydrogen and/or small alkyl groups having 1 to about 4 carbon atoms.

In addition to aromatic moieties, A can also be aliphatic such as a linear or branched chain having from 3 to about 20 carbon atoms. Although Y is again represented by the formula

wherein R and R' can be hydrogen, methyl or phenyl, there is here the exception that at least one of the groups must be phenyl, in order that the halogen, X be benzylic. The halogens X and number of Y groups n are the same as set forth hereinabove. The aliphatic carbons of A not carrying Y or alkyl branches will carry hydrogen.

The effect of inifer concentration has been found to be inversely proportional to the molecular weight of PIB. In general however, a concentration of from about $10^{-4}$ moles to about $10^{-1}$ moles, per mole of isobutylene monomer will yield PIB of useful molecular weights.

Polymerization of isobutylene with p-dicumyl chloride can be conducted at a temperature range of from about $-10°$ C. to about $-78°$ C. and in a polar solvent such as methylene chloride or solvent mixture. Polymerizations were conducted over a period of time ranging from about 1 minute to 1 hour with 10 minutes being preferred. In order for the inifer to initiate the polymerization, a solution of methylene chloride $CH_2Cl_2$ and a coinitiator such as boron trichloride $BCl_3$ was added to the reaction vessel. The inifer and $BCl_3$ solution thus form an initiator system. In lieu of $BCl_3$, other Friedel-Crafts acids such as $AlCl_3$, $SnCl_4$, $TiCl_4$, $SbCl_6$, $FeCl_3$ and the like can be utilized.

The general procedure followed for synthesizing a tertiary halogenated polyisobutylene is as follows:

All manipulations, polymerizations, transfers of chemicals, etc. were carried out in a stainless steel enclosure under nitrogen atmosphere. Polymerizations were conducted in baked out culture tubes equipped with teflon-lined screw caps. The tubes were charged with solvent, monomer, and pDCC, and cooled to the desired temperature. Reactions were started by adding a precooled solution of $BCl_3$ in $CH_2Cl_2$ to the charges. After desired times reactions were terminated by the addition of a few milliliters of prechilled methanol. Details of the equipment have been described by J. P. Kennedy *J. Appl. Polymer Sci.*, Appl. Polymer Symp. 30 (1977), to which reference can be made.

A 20:1 solvent/$BCl_3$ solution was prepared consisting of 20 parts of $CH_2Cl_2$ to 1 part $BCl_3$. 0.5 grams of p-dicumyl chloride were dissolved in 11 ml of $CH_2Cl_2$ to yield a master inifer solution having a concentration of 0.25 M.

The reaction vessel (baked out culture tube) was charged with 16.4 ml $CH_2Cl_2$ and 1.6 ml of isobutylene and 1 ml of the inifer master solution (0.25 M) and cooled to the desired temperature ($-50°$ C.). Next, 1 ml of the solvent/$BCl_3$ solution was added to initiate the reaction. The solution in the vessel immediately turned cloudy. Large lumps of polymer were formed in 5 to 120 seconds and the reaction was terminated after about 10 minutes by the addition of several mls of methanol. The resultant polymer and that obtained from identical reactions, was recovered by evaporation of volatiles and employed in characterization studies to verify the structure and composition thereof.

By selection of a multifunctional inifer, a telechelic multi-armed polymer can be synthesized. To demonstrate the efficacy of the process, 1,3,5-tris (α,α-dimethyl chloromethyl)benzene or tricumyl chloride TCC, was employed with isobutylene to form a tri(t-chloro) polyisobutylene tristar.

The general procedure was as follows:

A master solution of TCC was prepared by dissolving 0.204 gm of the inifer in 25 ml of $CH_2Cl_2$. Five ml of this solution was added to two separate flasks; the first containing 48 ml of isobutylene in 146 ml of $CH_2Cl_2$ and the second containing 56 ml of isobutylene in 132 ml of $CH_2Cl_2$. All solutions were cooled to $-50°$ C. prior to mixing, the order of addition being solvent, isobutylene, inifer and $BCl_3$. From a master solution comprising 1.1 ml $BCl_3$ in 19.1 ml of $CH_2Cl_2$, 2.5 ml was added to each flask and shaken for 10 minutes. Polymerization was thereafter terminated with precooled methanol following which the product was separated and purified. Characterization studies verified the structure and composition of the polymer product as that of a polyisobutylene tristar carrying three tertiary chlorine termini.

Thus, from the foregoing examples it is seen that telechelic di(t-chloro)polyisobutylenes and telechelic tri(t-chloro)polyisobutylenes can be obtained. The conversion of either telechelic polymer to the di- or triolefin first which, in turn, can be synthesized to diols (dihydroxy) or triols, respectively is a primary object of the present invention and shall be described now in detail utilizing the telechelic di(t-chloro) polyisobutylene as exemplary. As explained hereinabove, the telechelic di- and trihalogenated polyisobutylenes can also be thought of as products resulting from two or three polyisobutylene arms or branches one end of each being linked to an inifer residue, generally a phenyl ring, and the other end carrying the halogen. Although the phenyl ring is important for characterization studies of the telechelic polymers, it is practical to ignore its presence in a polymer product having a number average molecular weight of about 500 to 150,000. For this reason the novel telechelic polymers of the present invention are linear and tristar telechelic homopolymers.

The basic reaction for conversion of the dihalogenated telechelic polyisobutylene is one of dehydrohalogenation which is conducted in such a manner as to yield 1-olefins. We have found that this reaction can be facilitated with a strong base such as potassium t-butoxide in the presence of refluxing tetrahydrofuran (THF). Conversion of the tertiary chlorine with the potassium t-butoxide is conducted during refluxing for a period of time of from about 0.2 to about 8 hours. The reaction is thereafter permitted to cool to room temperature after which n-hexane is added, followed by repeated washings with distilled water and ultimate separation via conventional means viz., filtering, evaporation of solvent and drying under vacuum.

Number average molecular weight of the starting telechelic t-chlorinated polyisobutylene is from about 500 to about 50,000 for useful products, although other molecular weights are not necessarily excluded. To demonstrate the process of the present invention, a typical dehydrohalogenation was conducted as follows in three-neck flasks equipped with stirrer, condenser and dropping funnel under a dry nitrogen atmosphere:

To a refluxing solution of polyisobutylene ($\overline{M}_n$=4500) containing two t-chlorine termini in THF (3.0 g/100 ml) was added dropwise a solution of potassium t-butoxide in THF (2.0 g/30 ml) over a period of 10 minutes, stirred for 20 hours and then cooled to room temperature. Subsequently, 50 ml n-hexane was added and stirred for a few minutes, then 50 ml distilled water was introduced and stirred for 10 minutes; the resulting organic layer was then washed three times with 150 ml distilled water each, separated and dried with anhydrous magnesium sulfate. Finally the product was filtered, the solvent removed by evaporation and dried in vacuo in 75° C. overnight.

In order to verify the diolefin structure, H¹ NMR spectroscopy was performed by a Varian Associates T-60 NMR spectrometer at room temperature. Solutions of 10–15% polymer in CCl₄ with a few percent TMS standard were employed.

The H¹ NMR spectrum of the product obtained by dehydrochlorination of Cl-PIB-Cl ($\overline{M}_n$≈4500) was analyzed in three regions. The first region, from 1.0 to 2.0 ppm, contained protons associated with the various methyl and methylene groups. Specifically, resonances found at 1.75 and 1.93 ppm indicated the presence of —C$\underline{H}_2$—C(C$\underline{H}_3$)=CH₂ protons. Two large resonances at 1.1 and 1.4 ppm were associated respectively with —C$\underline{H}_3$ and —C$\underline{H}_2$—protons in isobutylene units along the PIB backbone excluding those at chain ends.

The second region, from 4.5 to 5.0 ppm, contained two important resonances at 4.58 and 4.78 ppm associated with —CH₂—C(CH₃)=C$\underline{H}_2$ protons.

The third region from 7.0 to 7.5 ppm contained only one sharp resonance at 7.15 ppm indicating aromatic protons. Integration of this area and that between 4.5 to 5.0 ppm showed the presence of an equal number of protons in these regions. This was expected inasmuch as the 7.15 ppm resonance represented four aromatic protons and the resonances at 4.58 and 4.78 represented four vinylene protons. This result is consistent with 100% dehydrochlorination, and indicated a functionality of 2.0, i.e., two unsaturated end groups per PIB chain.

On the basis of these observations and taking into account synthesis and characterization details of the di(t-chloro)polyisobutylene described hereinabove, the following structure for the novel telechelic diolefin polymer, α,ω-di(isobutenyl)polyisobutylene is proposed:

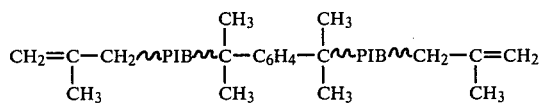

It will be noted that the inifer residue, a phenyl ring, is incorporated in the polyisobutylene chain.

Having synthesized the telechelic diolefin, it is to be understood that a triolefin from a telechelic trihalogenated polyisobutylene, such as prepared with the inifer tricumyl chloride, can be synthesized in an equivalent manner. Conversion of the diolefin to the dihydroxy or diol was next sought. As stated hereinabove, a polyisobutylene carrying two terminal primary —OH functions would be an extremely useful soft segment, for polyurethane chemistry. Similarly, a star polyisobutylene carrying three terminal primary —OH functions would also be useful for this purpose.

The process selected involved the regioselective hydroboration of α,ω-di(isobutenyl)polyisobutylene followed by alkaline hydrogen peroxide oxidation of the polymeric borane. The reactions were again conducted in the presence of refluxing THF. 9-Borabicyclo-[3.3.1] nonane, abbreviated 9-BBN was employed as a 0.5 M solution in THF for hydroboration. This compound converts the telechelic diolefin to a polymeric borane which can then be oxidized to primary hydroxyls with alkaline hydrogen peroxide. The oxidation is conducted with stoichiometric amounts of sodium hydroxide and 30% hydrogen peroxide for a period of time of from about 0.2 to about 4 hours at a temperature of about 45° C.

Number average molecular weight of the starting telechelic t-chlorinated polyisobutylene is again from about 500 to about 50,000 for useful products, although other molecular weights are not necessarily excluded. To demonstrate the process of the present invention, a typical hydroboration and oxidation was conducted as follows in three-neck flasks equipped with stirrer, condenser and dropping funnel under a dry nitrogen atmosphere:

An excess of 9-BBN was added dropwise to a 100 ml THF solution (2 wt. %) of α,ω-di(isobutenyl)polyisobutylene. After 5 hours at room temperature stoichiiometric amounts of 3 N NaOH and subsequently 30% H₂O₂ were added dropwise maintaining the temperature below 45° C. The mixture was allowed to react for two hours, then 50 ml n-hexane was added, stirred for a few minutes, and the aqueous phase was saturated with potassium carbonate. The organic layer was washed with distilled water, separated and dried with anhydrous magnesium sulfate. After filtration the solvent was evaporated and the product was dried under vacuum at ambient temperature. The cyclic diol (cis-1,5-cyclooctanediol) was removed by repeated extractions with methyl ethyl ketone and the product was dried under vacuum at ambient temperature.

In order to verify the dihydroxyl structure, H$^1$ NMR analyses were carried out by a Varian Associates T-60 NMR spectrometer. Solutions of approximately 10–15% polymer in CCl$_4$ were employed. Hydroxyl groups were also converted to silanes for H$^1$ NMR spectroscopy by dissolving 0.25 g of the telechelic dihydroxy polyisobutylene in 2.5 ml CCl$_4$. Next 0.5 ml dry pyridine and 0.2 ml freshly distilled trimethylchlorosilane were added. The mixture was stirred for 20 minutes at room temperature, then the excess of reagents were removed by evaporation at 70° C., filtered and the product was dried under vacuum at ambient temperature overnight. Silylation introduced terminal —Si(CH$_3$)$_3$ groups which can be accurately assayed on account of the 9 methyl protons per end group. H$^1$ NMR spectroscopy indicated essentially complete conversion of the olefin into the primary alcohol.

In experiments with several telechelic diolefin polyisobutylenes, excess 9-BBN and long reactions times were used to compensate for slow hydroboration and oxidation rates due to low end group concentration and possible steric retardation. Fortunately, an αCH$_3$— *substituent seems to accelerate hydroboration with* 9-BBN. H$^1$ NMR spectra of the telechelic diolefin starting material and the diol product were made, the significant aspect of these spectra being the complete absence of olefinic protons at 4.58 and 4.78 ppm in the diol spectrum even at high amplification. The transformation of olefinic end groups into hydroxyl end groups was therefore believed to be complete.

To ascertain the presence of —CH$_2$OH groups, the purified diol was reacted with Cl—Si(CH$_3$)$_3$. This treatment is known to result in the complete conversion of —OH to —Si(CH$_3$)$_3$, i.e., in the introduction of 9 CH$_3$ protons for 1 OH proton. From that spectrum, the appearance of a sharp resonance at 0 ppm indicated the presence of —Si(CH$_3$)$_3$ group in the polymer.

Significantly, the proton ratio —Si(CH$_3$)$_3$/—C$_6$H$_4$— provides quantitative proof for the end groups. Telechelic linear polymers produced by the inifer method possess an internal p disubstituted phenyl ring in the chain as has been set forth in the aforementioned application, Ser. No. 73,790. The four aromatic protons are in fact internal standards for quantitative H$^1$ NMR studies. According to the spectrum shown of the silylated product, the ratio of the trimethyl silyl protons to these aromatic protons is 4.6±0.1 which is quite close to the theoretical ration of 4.5 (i.e., 18/4) expected to arise in a perfectly bifunctional telechelic diol. By this evidence, then, the terminal functionality is 2.04±0.04.

On the basis of the foregoing observations, the structure of the novel telechelic dihydroxy polymer thus formed, α,ω-di(hydroxyl)polyisobutylene is

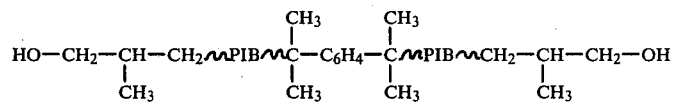

It will be noted that the inifer residue, a phenyl ring, remains incorporated in the polyisobutylene chain. Thus, the telechelic dihydroxy polyisobutylene herein differs from the prior in that its functionality is exactly 2.0 per molecule and by virtue of the fact that it carries a phenyl ring in the polymer chain.

A schematic review of the syntheses of telechelic diolefin and dihydroxy polyisobutylenes from telechelic di(t-chloro)polyisobutylene is as follows wherein the product I represents the telechelic dihalogen; the product II, the telechelic diolefin; the product III, the polymeric borane; and, the product IV, the telechelic diol.

p-dicumyl chloride/BCl$_3$/isobutylene polymerization with an inifer

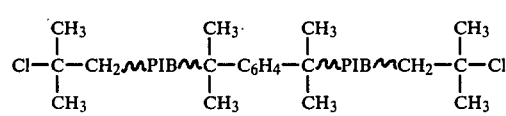

(I)

dehydrochlorination (—HCl)    t-BuOK/THF/reflux

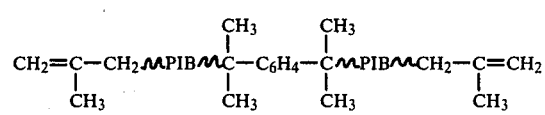

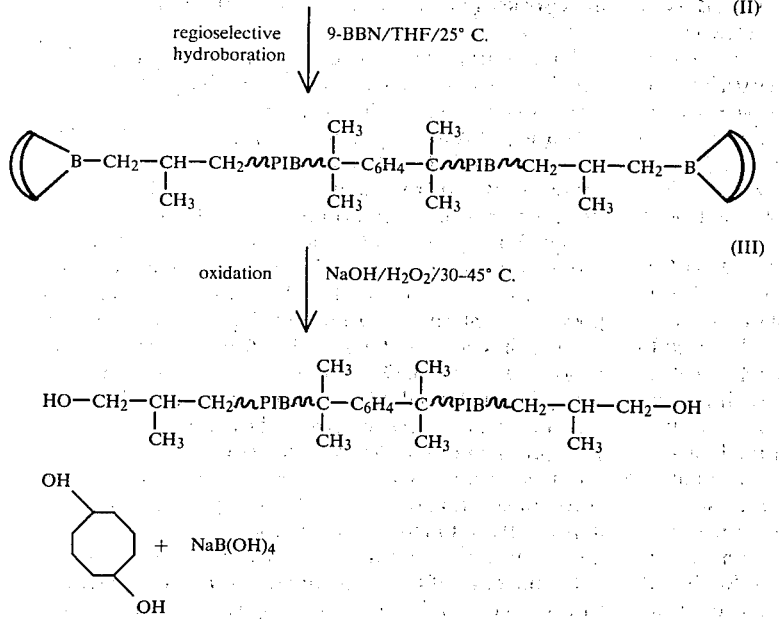

-continued

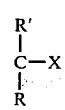

As stated hereinabove, it is to be understood that while only the conversion of telechelic di(t-chloro) polyisobutylene to the telechelic diolefin and it, in turn, to the telechelic diol has been detailed, that the same conversion of the telechelic tri(t-chloro)polyisobutylene to triolefin and triol can be effected. Moreover, by employing a telechelic polymer having more than three telechelic halogens, viz., four to six, other polymers having as many unsaturations or hydroxyl groups will result.

Thus it can be seen that the disclosed invention carries out the objects set forth hereinabove. As will be apparent to those skilled in the art, the composition of the telechelic olefin and hydroxy polymers can be varied within the scope of our total specification disclosure by the selection of the various telechelic halogenated polymers, and it is believed that the preparation and use of these according to the preferred process of the invention can be determined without departing from the spirit of the invention herein disclosed and described, the scope of the invention being limited solely by the scope of the attached claims.

I claim:

1. A novel telechelic polymer formed from an inifer and a cationically polymerizable olefin monomer having from about 4 to about 12 carbon atoms, said polymer having a residue of said inifer in the backbone thereof and carrying at least two terminal unsaturations;

said inifer selected from compounds having the following formula: $AY_n$, where A is selected from the group consisting of condensed and noncondensed aromatic compounds having from 1 to 4 rings, and linear and branched aliphatic compounds having from 3 to 20 carbon atoms, where Y is represented by the following formula:

$$\begin{array}{c} R' \\ | \\ C-X \\ | \\ R \end{array}$$

where R and R' are selected from the group consisting of hydrogen, methyl, and phenyl, and R and R' can be the same when A is an aromatic compound, or where R or R' is phenyl when A is an aliphatic compound;

where X is a halogen selected from the group consisting of fluorine, chlorine, and bromine, and where n is an integer from 2 to 6.

2. A novel telechelic polymer, according to claim 1, wherein said cationically polymerizable olefin monomer is isobutylene.

3. A novel telechelic diolefin polymer as set forth in claim 2, comprising:

α,ω-di(isobutenyl)polyisobutylene.

4. A novel telechelic triolefin polymer, as set forth in claim 2, comprising:

tri(isobutenyl)polyisobutylene tristar.

5. A telechelic polymer, comprising a polymer having the formula

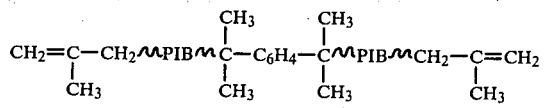

wherein PIB is a polyisobutylene moiety, and where said telechelic polymer has a number average molecular weight of from about 1,000 to about 100,000.

6. A telechelic polymer, comprising a polymer having the formula

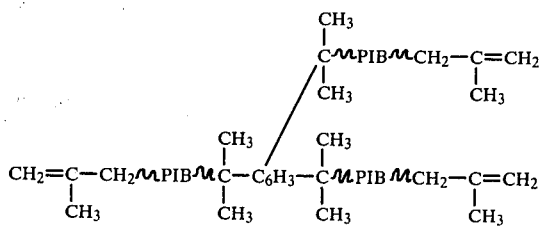

wherein PIB is a polyisobutylene moiety, and where said telechelic polymer has a number average molecular weight of from about 1,500 to about 150,000.

* * * * *